United States Patent [19]

Tree et al.

[11] 4,011,295
[45] Mar. 8, 1977

[54] CERAMIC ROTOR FOR GAS TURBINE ENGINE

[75] Inventors: Dennis Jack Tree, Scottsdale; F. Michael Tovey, Tempe, both of Ariz.

[73] Assignee: The Garrett Corporation, Los Angeles, Calif.

[22] Filed: Oct. 7, 1974

[21] Appl. No.: 512,817

[52] U.S. Cl. .............................. 264/275; 264/271; 264/332; 416/229 A; 416/241 B
[51] Int. Cl.² .......................................... F01D 5/28
[58] Field of Search .............. 416/241, 224, 241 B, 416/229, 244 A, 230, 229 A, 218; 29/156.8 R, 156.8 B, 420; 228/193; 264/125, 271, 332, 111, 275

[56] References Cited

UNITED STATES PATENTS

| | | | |
|---|---|---|---|
| 804,410 | 11/1905 | Keller | 416/244 A |
| 874,993 | 12/1907 | Rice | 416/218 |
| 2,297,508 | 9/1942 | Schutte | 416/241 B UX |
| 2,769,611 | 11/1956 | Schwarzkopf | 416/241 B UX |
| 3,025,037 | 3/1962 | Beckstrom | 416/241 B UX |
| 3,501,090 | 3/1970 | Stoffer et al. | 416/244 A X |
| 3,699,623 | 10/1972 | Kreider | 29/156.8 B |
| 3,717,419 | 2/1973 | Olcott | 416/230 |
| 3,731,360 | 5/1973 | Stone | 29/156.8 B |
| 3,854,189 | 12/1974 | Ezis et al. | 29/420 |
| 3,857,650 | 12/1974 | Cerrato | 416/195 X |
| 3,881,845 | 5/1975 | Hauck | 416/241 B |
| 3,885,294 | 5/1975 | Chaundy et al. | 29/420 |
| 3,887,411 | 6/1975 | Goodyear et al. | 416/241 B X |
| 3,887,412 | 6/1975 | Styhr et al. | 416/241 B X |
| 3,892,835 | 7/1975 | Holdsworth | 264/332 |
| 3,905,723 | 9/1975 | Torti | 416/241 B |
| 3,911,188 | 10/1975 | Torti | 416/241 B X |

FOREIGN PATENTS OR APPLICATIONS

| | | | |
|---|---|---|---|
| 246,994 | 11/1960 | Australia | 416/244 A |
| 55,020 | 6/1951 | France | 416/241 B |
| 1,040,697 | 10/1953 | France | 416/218 |
| 394,495 | 1933 | United Kingdom | 416/218 |

OTHER PUBLICATIONS

Gas Turbine International – July–Aug. 1972, pp. 16–19.

Primary Examiner—Everette A. Powell, Jr.
Attorney, Agent, or Firm—Herschel C. Omohundro; James W. McFarland; Albert J. Miller

[57] ABSTRACT

The subject rotor comprises a disklike body having hub and rim sections joined by a web section. The body is cast, molded or otherwise suitably formed of powdered silicon (and a binder, if necessary, to make it retain its shape until finally treated) which is reaction bonded to convert the silicon particles into a unitary mass. During the casting, molding or other forming step, one or more reinforcing rings of hot pressed silicon nitride or other suitable ceramic are embedded in the body. The ceramic selected must be one which will unite with the silicon during the reaction bonding operation to make a unitary mass. The reinforcing ring or rings are located in regions exposed to unusual stress in the use of the rotor to achieve the required strength.

8 Claims, 5 Drawing Figures

CERAMIC ROTOR FOR GAS TURBINE ENGINE

BACKGROUND OF THE INVENTION

This invention relates generally to gas turbine engines and more particularly to rotors or turbine wheels. Still more particularly, the invention relates to a ceramic rotor and a method of forming the same.

Heretofore, gas turbine rotors or wheels have been constructed of metal. In some instances the metal is forged or cast and then machined into final form. In other instances the wheel or rotor may be fabricated of sheet metal, the material in all cases being required to resist high temperatures and corrosive actions of the gases of combustion. In addition, the rotors must be designed to resist deformation and/or breakage due to high stresses encountered during operation at high speeds.

Prior rotors have been satisfactory to a certain degree, but in order to secure greater efficiency and other objectives it is proposed to operate the engines at higher temperatures which decrease the active life of the metal rotors causing premature destruction of the engines.

To avoid the above objection, it has been proposed to construct rotors of ceramic material which will withstand the high temperatures and corrosive action of the gases of combustion. Such attempts have not been completely successful, however, as the rotors produced do not possess the strength required to resist centrifugal forces due to high-speed operation. Furthermore, the methods employed in producing the ceramic rotors make their cost prohibitive.

SUMMARY OF THE INVENTION

An object of this invention is to construct a rotor of ceramic material having reinforcing means incorporated therein at the time of manufacture and in a manner to make it become an integral part of the rotor, the reinforcing means being so located that it will strengthen the rotor where necessary and being composed of a material which will have the heat and corrosion resisting characteristics of the material forming the major part of the rotor.

Another object of the invention is to construct a rotor of silicon powder which has been molded around a previously constructed reinforcing element and then reaction bonded to form a unitary body, the reinforcing element being made of a material with which the silicon powder unites during the reaction bonding operation.

A further object of the invention is to construct a rotor having hub and rim sections connected by a web, the hub and rim sections each having a preformed reinforcing corelike element incorporated therein, such element serving to resist undue stress caused by centrifugal forces, the rotor proper and reinforcing element being fabricated by a unique method which produces an integral structure characterized by high strength.

A still further object of the invention is to construct a rotor having a hub section with means, known in the trade as curvic couplings, for transmitting motion to adjacent mechanisms and locating the reinforcing corelike element to add strength in the regions of the curvic couplings.

Other objects and advantages of the invention will be pointed out or made obvious by the following description of the form of the invention shown in detail in the accompanying drawings:

IN THE DRAWINGS

DESCRIPTION OF THE INVENTION

Figure 1:
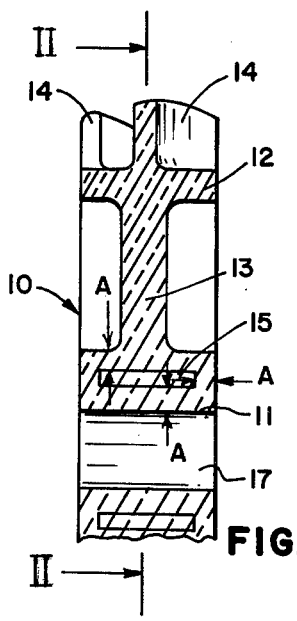
FIG. 1 is a vertical transverse sectional view taken through a ceramic rotor formed in accordance with the present invention.

Referring more particularly to the drawing, and especially to FIG. 1, a ceramic rotor for a gas turbine engine is designated generally by the numeral 10. Fundamentally, the rotor 10 is conventional in that it includes a hub section 11, a rim section 12, and a web section 13 connecting the first two sections. A plurality of blades or vanes 14 project radially in spaced order from the rim section. These blades or vanes 14 are exposed to and engaged by the hot gases of combustion during the operation of the turbine. The gases developed by burning fuel of various kinds attain quite high temperatures and include components which have a very corrosive action on metals frequently used for turbine rotors. The ability of the metal turbine rotors to withstand the stress at high temperatures and corrosion limits the life and range of operation of the turbines.

The primary objective of this invention is to make a rotor of ceramic material which will withstand the stress at higher temperatures, as well as the corrosive effects of the hot gases. It is, therefore, proposed to fabricate a rotor of silicon nitride and to reinforce the rotor in regions exposed to stress during the operation of the turbine equipped with such rotor. It is further proposed to develop a unique method of constructing the ceramic rotor which will lend itself to mass production at an economical rate.

Figure 2:
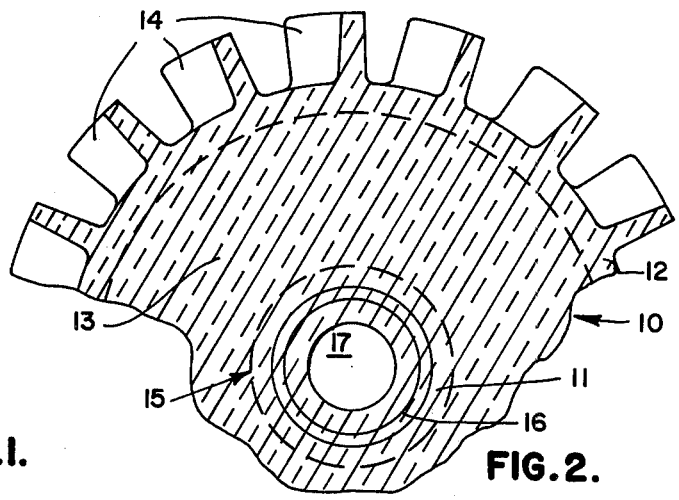
FIG. 2 is a detail sectional view taken on the plane indicated by the line II—II of FIG. 1.

In carrying out the above-mentioned objective, the rotor 10 is molded from powdered silicon either with or without a binder. During the molding operation, one or more reinforcing elements 15 are embedded in the rotor body. Each element 15 is also composed of silicon which has been hot pressed into the desired shape and size (in FIGS. 1 and 2 a ring shape 16 has been illustrated). Element 15 is located in the hub section of the rotor. It has been sized so that the powdered silicon which surrounds it is of a predetermined thickness A most conducive to the penetration of the reducing atmosphere to which it is exposed in the heat treating or reaction bonding furnace. During the exposure to heat, the silicon particles soften and fuse together to form a unitary structure. The particles engaging the reinforcing element also unite or bond with the element, making a one-piece structure. Following the reaction bonding step, the bore 17 may be finished to the required size by grinding or other suitable operation. By the foregoing method a one-piece silicon nitride rotor has been formed with the required strength in a critical region to withstand loads incident to usual operations but at increased temperatures. The method may include high production steps such as multiple injection molding which will produce finished products at relatively reduced cost.

Figure 3:
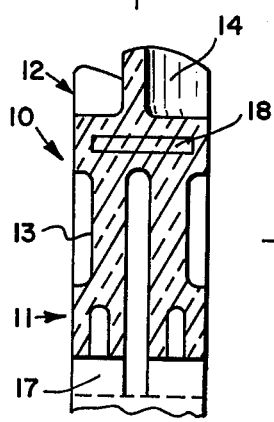
FIG. 3 is a view similar to FIG. 1 showing a modified form of the invention.

In the form of rotor shown in FIG. 3, a reinforcing ring 18 is provided at the rim section 12. This ring is also formed of hot pressed silicon and is embedded in the rotor during the molding operation. Ring 18 becomes an integral part of the rotor during the reaction bonding step and lends strength to the rim section. It resists stress resulting from high-speed rotation and loads imposed by centrifugal force acting on the turbine blades 14.

Figure 4:
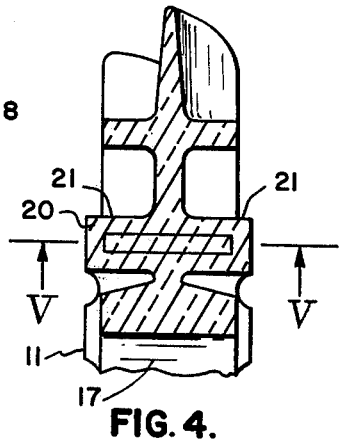
FIG. 4 is a similar view of a further modified form of the invention.
Figure 5:
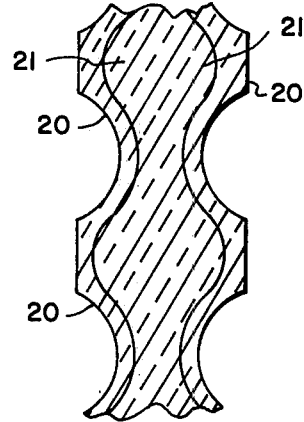
FIG. 5 is a detail sectional view taken on the line V—V of FIG. 4.

In FIGS. 4 and 5, the hub section of the rotor is shown with curvic coupling means 20 formed thereon. This means includes curved projections 21 on either or both sides of the hub for engagement with similar projections on associated mechanism to impart or receive driving forces to or from such mechanism. The projections may be reinforced also by having suitably shaped rings or other elements incorporated therein. These reinforcing members are preformed of hot pressed silicon and are embedded in the silicon powder as the rotor is being molded. The above and other references to silicon powder are intended to include dry ingredients as well as mixtures of silicon powder with binders either in dry, semi-dry, or slurry forms.

In each form of the invention illustrated, the reinforcing element is generally ring-shaped and is composed of hot pressed silicon nitride. The element or elements are embedded in the rotor during the molding operation and combine with the silicon of the rotor during the reaction bonding operation to form an integral body. No machining or other finishing operation need be performed on the reinforcing element prior to embedding the same in the rotor body during molding thereof. Since the reinforcing elements are composed of the same basic material from which the rotor is formed, the materials fuse together during the reaction bonding operation and make an integral unit with requisite strength in the regions subjected to unusual or concentrated loads.

While the invention has been shown and described in several forms, minor changes in the materials and methods may be employed without departing from the invention as set forth herein.

We claim:

1. A method of forming a ceramic rotor for a gas turbine engine, comprising the steps of:
    (a) hot pressing a quantity of refractory material to form a reinforcing element of predetermined shape;
    (b) supporting said reinforcing element in a mold cavity conforming to the shape of the rotor desired;
    (c) filling the cavity with pulverized refractory material to mold the rotor body with the reinforcing element embedded therein; and
    (d) exposing the molded body to high temperature in a reducing atmosphere to reaction bond the refractory material of the body and reinforcing element into a unitary article.

2. The method of forming a ceramic rotor for a gas turbine engine of claim 1 in which said pressing step includes forming a ring shaped reinforcing element, and said supporting step includes providing a mold cavity having hub, web, and rim forming regions, and supporting the reinforcing element in the hub forming region of the cavity.

3. The method of forming a ceramic rotor for a gas turbine engine of claim 1 in which said pressing step includes forming a ring shaped reinforcing element, and said supporting step includes providing a mold cavity having hub, web, and rim forming regions, and supporting the reinforcing element in the rim forming region of the cavity.

4. The method of forming a ceramic rotor for a gas turbine engine of claim 1 in which said pressing step includes forming a ring shaped reinforcing element, and said supporting step includes providing a mold cavity having hub, web, and rim forming regions, and supporting the reinforcing element in the cavity between the hub and rim forming regions thereof.

5. The method of forming a ceramic rotor for a gas turbine engine of claim 1 in which said pressing step includes forming a ring shaped reinforcing element, and said supporting step includes providing a mold cavity having hub, web, and rim forming regions and curvic coupling forming regions at the sides adjacent the hub region, and supporting the reinforcing element in the cavity substantially in registration with the curvic coupling forming regions thereof.

6. A method of forming a ceramic rotor for a gas turbine engine, comprising the sequential steps of:
    a. supporting a reinforcing element of hot pressed refractory material in a mold cavity conforming to the shape of the rotor desired;
    b. embedding the reinforcing element in a rotor body by filling the cavity with pulverized refractory material to mold the rotor body in substantially completely surrounding relationship to the reinforcing element;
    c. exposing the molded body to high temperature in a reducing atmosphere; and
    d. allowing the reducing atmosphere to penetrate through the molded body to the embedded reinforcing element to cause reaction bonding of the embedded reinforcing element and the molded body into a unitary article.

7. A method as set forth in claim 6, wherein said supporting step includes suspending the reinforcing element in a selected region of the cavity with the reinforcing element spaced a preselected, substantially equal distance from walls of the cavity in the selected region.

8. A method of forming a ceramic article comprising the sequential steps of:
    suspending a reinforcing element of hot pressed refractory material in a mold cavity conforming to the shape of the article desired, with the element substantially spaced from adjacent surfaces of the cavity;
    filling the cavity with refractory material to mold a body in substantially completely surrounding relationship to the element such that the element is embedded substantially completely within the body with no surfaces of the element exposed to the exterior of the body;
    exposing the molded body to high temperature in a reducing atmosphere; and
    allowing the reducing atmosphere to penetrate through the body to the element to cause reaction bonding of the element and body into a unitary article.

* * * * *